United States Patent [19]
Clifford, III.

[11] Patent Number: 5,093,008
[45] Date of Patent: Mar. 3, 1992

[54] PROCESS AND APPARATUS FOR RECOVERING REUSEABLE WATER FORM WASTE DRILLING FLUID

[75] Inventor: James Clifford, III., Bakersfield, Calif.

[73] Assignee: Geo Drilling Fluids, Bakersfield, Calif.

[21] Appl. No.: 317,156

[22] Filed: Feb. 28, 1989

[51] Int. Cl.$^5$ .............................................. C02F 1/56
[52] U.S. Cl. ......................................... 210/725; 175/66; 210/712; 210/727; 210/738; 210/756; 210/787; 210/195.1; 210/199; 210/202; 210/205; 210/257.1; 210/258
[58] Field of Search ................... 175/66; 210/712, 805, 210/787, 727, 747, 195.1, 257.1, 512.1, 756, 757, 724, 725, 738, 199, 202, 205, 258

[56] References Cited

U.S. PATENT DOCUMENTS

| | | | |
|---|---|---|---|
| 4,353,803 | 10/1982 | Dover, Jr. ............................ | 210/721 |
| 4,366,063 | 12/1982 | O'Connor ............................. | 210/652 |
| 4,395,338 | 7/1983 | Rowton ................................. | 210/747 |
| 4,428,425 | 1/1984 | Young et al. ........................ | 166/267 |
| 4,447,330 | 5/1984 | Babineaux, III. ................... | 210/717 |
| 4,482,459 | 11/1984 | Shiver ................................. | 210/725 |
| 4,507,208 | 3/1985 | Simon et al. ........................ | 210/721 |
| 4,536,293 | 8/1985 | Babineaux, III. ................... | 210/717 |
| 4,755,303 | 7/1988 | Sweat .................................. | 210/724 |
| 4,774,007 | 9/1988 | Gordon ................................ | 210/805 |

FOREIGN PATENT DOCUMENTS 2191522 12/1987 United Kingdom ................... 175/66

OTHER PUBLICATIONS

Wojtanowicz, A. K., *Comparison Study of Solid/Liquid Separation Techniques for Olfield Pit Closures*, Journal of Petroleum Technology, Jul., 1987.

Nordquist, D. G. et al., *A Case History of Dewatering and Recycling Sump Drilling Mud on 141 Wells in the Midway Sunset Field, California*, IADC/SPE 17246, IADC/SPE Drilling Conference Feb. 28–Mar. 2, 1988.

Osterman, M. c. et al., *The Development Study of a Centrifuging Technique for Oilfield Production Pit Closure*, Dec. 1987, vol. 109, Journal of Energy Resources Technology.

Wojtanowicz, A. K. *Modern Solids Control: A Centrifuge Dewatering-Process Study*, SPE/IADC 16098, SPE/IADC 1987 Drilling Conference, New Orleans, Mar. 15–18, 1987.

*Primary Examiner*—Peter Hruskoci
*Attorney, Agent, or Firm*—Lyon & Lyon

[57] ABSTRACT

A dewatering porocess and apparatus for recovering water from waste drilling fluid for concurrent reutilization in an active drilling operation includes a storage area, an intermixer for introducing treatment chemicals into the waste drilling fluid and a centrifuge. Flocculation is chemically induced in the waste drilling fluid as it passes through the intermixing means for introducing treatment chemicals into the waste drilling fluid. The waste drilling fluid is then transferred to the centrifuge wherein it is separated into solid waste and clear reuseable water. The water is returned to the storagge area and may be chemically adjusted prior to being returned to the drilling rig.

9 Claims, 1 Drawing Sheet

PROCESS AND APPARATUS FOR RECOVERING REUSEABLE WATER FORM WASTE DRILLING FLUID

BACKGROUND OF THE INVENTION

The field of the present invention is dewatering processes and apparatus for recovering water from waste drilling fluid for concurrent reutilization with an active drilling operation.

During the course of a drilling operation large quantities of water are consumed and must be continuously supplied so as not to slow down the drilling process. Much of the water consumed in a drilling operation is utilized to dilute drilling mud which serves to lubricate and cool the drill bit as well as circulate cuttings from the wellbore to the surface. As the cuttings build up in the drilling mud, the mud thickens and must be diluted with water. Consequently, the volume of drilling mud increases to a point where the excess mud and water contained therein must be disposed of as waste. The conventional practice is to dump the excess mud in a reserve pit or "sump" at the wellsite.

Water is also utilized at the wellsite for many purposes including washing off the drilling equipment. Accordingly, as the water collects around the drillsite it becomes contaminated with various materials and must be disposed of as contaminated water. A typical procedure is to transfer the contaminated water to the reserve pit or "sump" wherein it is mixed with the excess mud and later hauled away to a disposal site.

The combination of new environmental regulations, transportation fees, disposal site fees and associated costs make the disposal of waste drilling mud and contaminated water quite expensive. Similarly, it becomes quite costly to have a continuous supply of clean water trucked into the wellsite. This is especially true for wells that are often drilled in remote, dry areas that do not have access to large amounts of water.

A variety of techniques have been developed for dewatering mud waste pits and for purifying contaminated water thereby reducing the volume of waste and, hence, the waste disposal costs. The thrust of these techniques is to clean up existing sumps and holding tanks containing drilling mud and/or contaminated waste water. For example, U.S. Pat. No. 4,536,293 to Babineaux, III discloses a method for purifying waste water from a drilling operation utilizing a flocculation, aeration and sedimentation process. However, this method is incapable of dewatering waste drilling mud in a timely manner because of the drilling mud's high solids and/or clay content. U.S. Pat. No. 4,395,338 to Rowton discloses a method for dewatering a reserve pit through a boiling process. However, no provisions are made for recovering or reusing the water once it is separated from the waste drilling mud. Some techniques have even been developed to recover water that may be reused on some other drilling project. For example, U.S. Pat. No. 4,366,063 to O'Connor discloses a method for removing reusable water from waste drilling mud by passing the water through a filtering and absorbing means and then subjecting the water to reverse osmosis. However, this method is also incapable of clarifying large volumes of high solids and/or clay content fluids in a timely and economical manner. Also, articles have been published (e.g. Wojtanowicz, A. K., Society of Petroleum Engineers of AIME, p. 417-428, IADC/SPE/16098, March 1987; Nordquist, D. G. et al., IADC/SPE Drilling Conference, IADC/SPE #17246 February 1988) disclosing dewatering studies that have incorporated a flocculation process and centrifuge capable of dewatering waste drilling mud.

However, none of the methods discussed above discloses a means for solving the problem solved by the invention described herein.

SUMMARY OF THE INVENTION

The present invention is directed to a dewatering process and apparatus for recovering water from waste drilling mud and contaminated water for concurrent reutilization with an active drilling operation. To this end, flocculation is induced in the waste drilling fluid to allow a centrifuge to separate the waste drilling fluid into solid waste and reuseable water. The water may also be chemically adjusted prior to being returned to the active drilling operation.

To accomplish the foregoing, one object of the present invention is to provide a flocculation manifold which allows the waste drilling fluid to be chemically treated in an efficient and economic manner. Another object of the present invention is to provide a unique storage and pretreatment area that will allow for a more efficient use of the water and prevent contaminants from getting back into the active drilling operation.

Although the primary focus of this invention is directed to recovering water from waste drilling mud and contaminated water rapidly enough to be reused concurrently with an active drilling operation numerous other applications will be apparent to those skilled in the art from the disclosure which follows.

DETAILED DESCRIPTION OF THE PREFERRED EMBODIMENT

Figure 1:
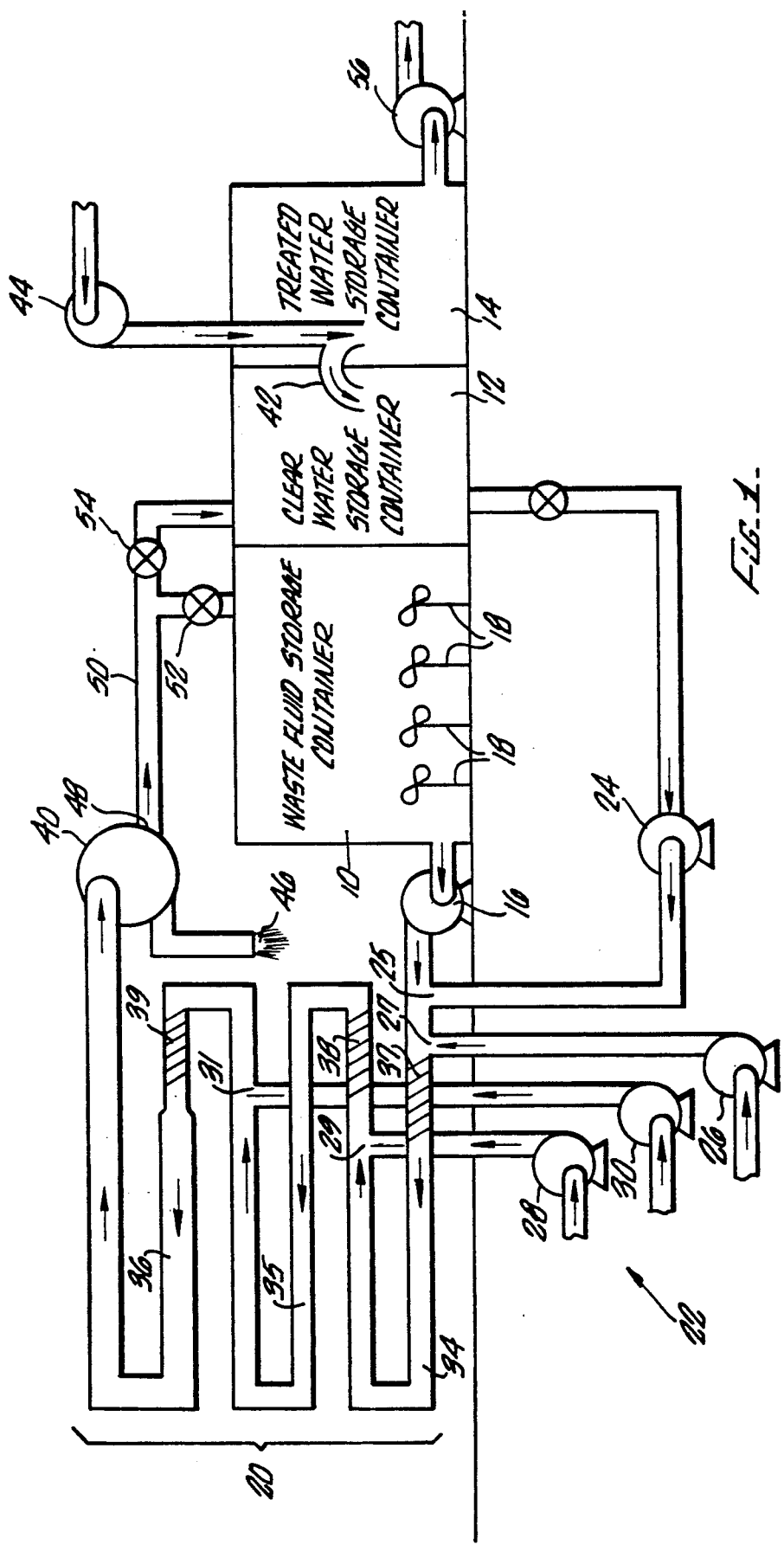
FIG. 1 is a schematic flow diagram of the present invention.

Turning in detail to the drawings, FIG. 1 illustrates a flow diagram of the dewatering process. In accordance with the process, waste drilling fluid which may include but is not limited to excess drilling mud and contaminated water at the well site is transferred to a fluid storage area and stored in a waste fluid storage container 10. The waste drilling fluid is then picked up via a pumping means or progressive cavity pump 16 and transferred through an intermixing means or flocculation manifold 20 containing chemical injection equipment 22 for treating the waste drilling fluid to induce flocculation therein. The waste drilling fluid then exits the flocculation manifold 20 into a dewatering centrifuge 40 wherein it is separated into solid waste which is subsequently disposed of and water containing dissolved chemicals which is either transferred back to the waste fluid storage container 10 if it needs to undergo the flocculation and centrifuge process again or to a clear water storage container 12. The water is then drawn through a siphoning device 42 to a treated water storage container 14 wherein it is chemically adjusted to make it compatible for utilization on the drilling rig.

The fluid storage area in the preferred embodiment is a reinforced steel pit that is compartmentalized into three sections including the waste fluid storage container 10, the clear water storage container 12 and the treated water storage container 14. Other embodiments may, of course, utilize two or more separate storage tanks.

The waste drilling fluid is initially stored in the waste fluid storage container 10 which is equipped with fluid agitation devices 18 to prevent solids in the waste drilling fluid from coagulating and settling at the bottom of the waste fluid storage container 10 and thereby becoming irremovable. Another advantage of incorporating the agitation devices 18 is that they allow the dewatering system to be shut down in order to service the equipment without worrying about whether or not the solids will settle out during down time.

Substantial advantages are also achieved through the utilization of the waste fluid storage container 10. For example, it allows for the transfer and storage of a greater volume of fluid from the drilling rig than can be immediately accommodated by the dewatering process. Similarly, the waste fluid storage container 10 allows large volumes of drilling fluid to be pretreated or batch treated with coagulants and acids when the volume of waste drilling fluid exceeds what can be handled by the chemical injection equipment 22 or when the chemical injection equipment 22 is malfunctioning. Thus, the waste fluid storage container 10 allows the drilling to proceed unhindered by concern over whether the drilling process should be slowed to reduce the flow of excess drilling fluid or concern over where the excess fluid should be stored or treated prior to entering the flocculation manifold 20.

A progressive cavity pump 16 is provided and is operatively connected to transport the waste drilling fluid from the waste fluid storage container 10 through the flocculation manifold 20. The flocculation manifold 20 consists of a series of parallel, interconnected conduits. In the present embodiment, the conduit is approximately 120 feet in length including an elongated section 34 and a second elongated section 35, having diameters of approximately two inches, and a third elongated section 36, with a diameter of approximately four inches. The volumes of the first section 34, second section 35 and third section 36 are in the ratio of approximately 1:2:4, respectively.

As the waste drilling fluid flows through the flocculation manifold metered applications of water, acid, coagulant and flocculent are introduced via the chemical injection equipment 22 including a water injection pump 24 operatively connected to meter water from the clear water storage container 12 to a water injection port 25, an acid injection pump 26, a coagulant injection pump 28 and a flocculent injection pump 30. A series of in-line mixers 37, 38, 39 are also provided to induce fluid turbulence and thoroughly intermix the water, treatment chemicals and waste drilling fluid into a homogenous mixture to achieve a state of flocculation in the waste drilling fluid. Competitive systems for dewatering waste drilling fluid and, more specifically, mud drilling fluid have attempted to promote flocculation before centrifuging by making all the necessary chemical injections along a single shorter length conduit section. However, these systems failed to provide a manifold that would sufficiently intermix the treatment chemicals with the waste drilling fluid or allow the waste drilling fluid to be retained for a sufficient amount of time to achieve efficient use of the treatment chemicals and, thereby, produce the absolute water clarity necessary to be reutilized on a concurrent drilling operation.

On some occasions, it is necessary to dilute the waste drilling fluid to insure optimum chemical reactions in the flocculation manifold 20. The dilution process consists of taking previously dewatered fluid from the clear water storage container 12 and reinjecting it into the waste drilling fluid through the water injection port 25. This water is ideal for diluting the waste drilling fluid because it has already been subjected to the flocculation process at least once and if any residuals of previous chemical treatments are still present they are effectively reused.

As the waste drilling fluid enters the first section 34 of the conduit water is pumped via the water injection pump 24 through the water injection port 25 to allow the waste drilling fluid to be diluted prior to being chemically treated. Immediately adjacent to the water injection port 25 is an acid injection port 27 utilized to meter acid into the waste drilling fluid to adjust its pH balance to a level more conducive to flocculation. Although this level may vary depending on the type of drilling fluid being processed, typically a pH level of 5-7 has been found to be adequate and conducive to flocculation. The water and acid are then intermixed with the waste drilling fluid as they pass through the first in-line mixer 37 located just past the acid injection port 27.

As the waste drilling fluid flows through the second section 35 of the conduit, the coagulant injection pump 28 meters a coagulant into the waste drilling fluid through a coagulant injection port 29. The choice of coagulant also varies depending on the type of drilling fluid being processed. However, coagulants that have been found to be acceptable include ferric chloride, alum and magnesium chloride. The coagulant and waste drilling fluid are then thoroughly intermixed together as they pass through a second in-line mixer 38 positioned just past the coagulant injection port 29. In the present embodiment, the second section 35 of the conduit has approximately twice the residence time of the first section 34 of the conduit in order to allow the coagulant sufficient time to react and thereby induce coagulation.

As the waste drilling fluid flows through the third section 36 of the conduit the flocculent injection pump 30 meters a flocculent through the flocculent injection port 31 into the waste drilling fluid. The flocculant also varies depending on the type of drilling fluid being processed. Typically, flocculants include polyacrylamide polymers of various molecular weight and charge density. The fluid and flocculent are then intermixed as they pass through a third in-line mixer 39. In the present embodiment, the third section 36 of the conduit has approximately four times the residence time of the first section 34 of the conduit in order to allow the flocculent sufficient time to react. In addition, the diameter of the third section 36 of the conduit past the in-line mixer 39 is enlarged in order to reduce fluid turbulence in the waste drilling fluid and thereby prevent the solid particles from dispersing as they exit the in-line mixer 39.

The waste drilling fluid from the flocculation manifold 20 exits into a high speed dewatering centrifuge 40 wherein it is subjected to a "g" force sufficient to separate the waste drilling fluid into solids and liquids. Although the "g" force may vary depending upon the type of fluid being processed, a "g" force between 1,000 and 2,100 would be sufficient to separate most types of waste drilling fluid. The solids are emitted through a port 46 in the centrifuge 40 whereby they are typically discarded into a transfer dump bin and hauled to a disposal site, an open-ended dump to be stacked on location by a skip loader for later disposal, or a sump for burial.

The liquid or clarified water which may contain dissolved acid, coagulant and flocculant is emitted through another port, 48 in the dewatering centrifuge 40. If the water is not of sufficient clarity to be used in the clear water storage container 12 a valve 52 allows the water to be recirculated through a conduit 50 back into the waste fluid storage container 10 wherein it will undergo the flocculation and centrifuge process again. The recirculation process is extremely important because it allows for "trial runs" through the flocculation manifold 20 until the chemical injection equipment 22 can be adjusted to efficiently treat the waste drilling fluid. Earlier attempts at developing a dewatering system for concurrent use with a drilling operation failed because a recirculation process was not provided. Thus, the system was not able to adjust to the waste drilling fluid as its content varied.

If the water is of sufficient clarity a valve 54 allows the water to be transferred through the conduit 50 to the clear water storage container 12. Other embodiments may eliminate the clear water storage container 12 in favor of a larger treated water storage container 14. However, at this point the processed water, which returns at a low pH level, is ideal for mixing flocculent which is often provided in particulate form. The water from the clear water storage container 12 is also found to be ideal to dilute the waste drilling fluid prior to its entering the flocculation manifold 20. Thus, the clear water storage tank 12 enables the dewatering system to be self-sufficient in terms of its own water needs.

The clear water is then decanted through the siphon device 42 into the treated water container 14. The siphon device 42 is best located at a position midway between the bottom of the clear water container 12 and the surface of the clear water therein thereby avoiding sediment and floating particles that may have made their way into the container. As the water gravity flows through the siphon device 42 it undergoes a chemical injection treatment to adjust the properties of the water to make it more compatible with the drilling mud and to remove any remaining acid, coagulant or flocculent still dissolved in the water. This treatment process becomes more important as the drilling operation progresses because the same water is repeatedly recycled through the drilling mud. Thus, chemical injection pump 44 controls the addition of various chemicals which may include, inter alia, caustic soda to adjust the pH balance, sodium carbonate to adjust the hardness in the water and sodium hypochlorite to reverse the polymerization that takes place during flocculation. The water in the treated water container 14 is then transferred back to the drilling rig for reuse via a pumping means 56.

Thus, an efficient mud dewatering system is disclosed which employs a flocculation and centrifuging process and apparatus for recovering water from waste drilling fluid in such a way that the water recovered can be concurrently reutilized on an active drilling operation. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A dewatering apparatus for recovering water from waste drilling fluid for concurrent reutilization in an active drilling operation to dilute drilling mud comprising:

a storage area for said waste drilling fluid;

an intermixing means including a conduit coupled with said storage area wherein said conduit is utilized to combine said waste drilling fluid with water, and chemicals including acid, coagulant and flocculent as said waste drilling fluid flows through said conduit having a length that provides a residence time that allows said waste drilling fluid to be retained for a period sufficient to produce a water clarity necessary for reutilization of resultant water in concurrent drilling operations, wherein said conduit comprises an acid injection means for injecting acid into a first elongated section of said conduit, a first in-line mixing means for inducing fluid turbulence in said first elongated section of said conduit, positioned downstream of said acid injection means, a coagulant injection means for injecting coagulant into a second elongated section of said conduit, positioned downstream of said first in-line mixing means, a second in-line mixing means for inducing turbulence in said second elongated section of said conduit, positioned downstream of said coagulant injection means, a flocculent injection means for injecting flocculent into a third elongated section of said conduit, positioned downstream of said second in-line mixing means, a third in-line mixing means for inducing turbulence in said third elongated section of said conduit, positioned downstream of said flocculent injection means, wherein the diameter of said third elongated section is enlarged downstream of said third in-line mixing means to reduce fluid turbulence and prevent solid particle dispersion in said waste drilling mud;

a pump operatively connected to transfer said waste drilling fluid from said storage area through said intermixing means;

a centrifuge operatively connected to receive said waste drilling fluid from said intermixing means and separate said mixture into solids and water containing acid, coagulant and flocculent;

a chemical treating means for treating the centrifuged water to remove acid, coagulant and flocculent and produce said water clarity.

2. A dewatering apparatus for recovering water from waste drilling fluid for concurrent reutilization in an active drilling operation to dilute drilling mud comprising:

a first storage area for said waste drilling fluid;

an intermixing means including a conduit coupled with said storage area wherein said conduit is utilized to combine said waste drilling fluid with water, and chemicals including acid, coagulant and flocculent as said waste drilling fluid flows through said conduit having a length that provides a residence time that allows said waste drilling fluid to be retained for a period sufficient to produce a water clarity necessary for reutilization of resultant water in concurrent drilling operations, wherein said conduit comprises an acid injection means for injecting acid into a first elongated section of said conduit, a first in-line mixing means for inducing fluid turbulence in said first elongated section of said conduit, positioned downstream of said acid injection means, a coagulant injection means for injecting coagulant into a second elongated section of said conduit, positioned downstream of said first in-line mixing means, a second in-line mixing means for inducing turbulence in said second elongated section of said conduit, positioned downstream of said coagulant injection means, a flocculent injection means for injecting flocculent into a third elongated section of said conduit, positioned downstream of said second in-line mixing means, a third in-line mixing means for inducing turbulence in said third elongated section of said conduit, positioned downstream of said flocculent injection means, wherein the diameter of said third elongated section is enlarged downstream of said third in-line mixing means to reduce fluid turbulence and prevent solid particle dispersion in said waste drilling mud;

a pump operatively connected to transfer said waste drilling fluid from said first storage area through said intermixing means;

a centrifuge operatively connected to receive said waste drilling fluid from said intermixing means and separate said waste drilling fluid into solids and centrifuged water containing acid, coagulant and flocculent;

a second storage area positioned to receive the centrifuged water containing acid, coagulant and flocculent;

a third storage area;

a decanting means for chemically treating the centrifuged water to remove acid, coagulant and flocculent and to produce said water clarity said decanting means being operatively connected to transfer said water to said third storage area.

3. The apparatus of claim 2 wherein said first storage area comprises an agitation means for inducing fluid turbulence in said waste drilling fluid.

4. The apparatus of claim 2 wherein said conduit further comprises a water injection means for injecting water into said first elongated section of said conduit.

5. The apparatus of claim 2 comprising a recirculation means operatively connected to alter the flow of water from said centrifuge to said first storage area or said second storage area.

6. A dewatering process for recovering water from waste drilling fluid for concurrent reutilization in an active drilling operation to dilute drilling mud comprising the consecutive steps of:
 a. diluting said waste drilling fluid with water;
 b. intermixing said diluted waste drilling fluid with an acid;
 c. intermixing said waste drilling fluid with a coagulant;
 d. intermixing said waste drilling fluid with a flocculent, said acid, coagulant and flocculent being intermixed with said waste drilling mud, as said waste drilling fluid flows through a conduit having a length to provide a residence time for the waste drilling fluid to be retained for a period sufficient to produce a water clarity necessary for reutilization of resultant water in concurrent drilling operations, wherein said conduit comprises an acid injection means for injecting acid into a first elongated section of said conduit, a first in-line mixing means for inducing fluid turbulence in said first elongated section of said conduit, positioned downstream of said acid injection means, a coagulant injection means for injecting coagulant into a second elongated section of said conduit, positioned downstream of said first in-line mixing means, a second in-line mixing means for inducing turbulence in said second elongated section of said conduit, positioned downstream of said coagulant injection means, a flocculent injection means for injecting flocculent into a third elongated section of said conduit, positioned downstream of said second in-line mixing means, a third in-line mixing means for inducing turbulence in said third elongated section of said conduit, positioned downstream of said flocculent injection means, wherein the diameter of said third elongated section is enlarged downstream of said third in-line mixing means to reduce fluid turbulence and prevent solid particle dispersion in said waste drilling mud;

e. centrifugally separating said waste drilling fluid into solids and water containing acid, coagulant and flocculent;
 f. chemically treating said water to remove acid, coagulant and flocculent to produce said water clarity.

7. A flocculation manifold for mixing waste drilling fluid with an acid, a coagulant, and a flocculent, comprising:
 a conduit for conducting fluid flow having an inlet for receiving waste drilling fluid and an outlet;
 an acid injection means for injecting acid into a first elongated section of said conduit, positioned downstream of said inlet;
 a first in-line mixing means for inducing fluid turbulence in said first elongated section of said conduit, positioned downstream of said acid injection means;
 a coagulant injection means for injecting coagulant into a second elongated section of said conduit, positioned downstream of said first in-line mixing means; a second in-line mixing means for inducing fluid turbulence in said second elongated section of said conduit, positioned downstream of said coagulant injection means;
 a flocculent injection means for injecting flocculent into a third elongated section of said conduit, positioned downstream of said second in-line mixing means; and
 a third in-line mixing means for inducing fluid turbulence in said third elongated section of said conduit, positioned downstream of said flocculent injection means, wherein the diameter of said third elongated section is enlarged downstream of said third in-line mixing means to reduce fluid turbulence and prevent solid particle dispersion in said waste drilling mud, and wherein said conduit has a length to provide a residence time that allows said waste drilling fluid to be retained for a period sufficient to produce a water clarity necessary for reutilization of resultant water in concurrent drilling operations.

8. A dewatering apparatus for recovering water from waste drilling fluid for concurrent reutilization in an active drilling operation to dilute drilling mud having an inlet to receive waste drilling fluid and an outlet, comprising:
 an intermixing means which includes a conduit coupled with said inlet to receive waste drilling fluid and for mixing the waste drilling fluid with acid, a coagulant, and a flocculent wherein said conduit has a length to provide a sufficient residence time that allows said waste drilling fluid to be retained for a period sufficient to produce a water clarity necessary for reutilization of resultant water in concurrent drilling operations, wherein said conduit comprises an acid injection means for injecting acid into a first elongated section of said conduit, a first in-line mixing means for inducing fluid turbulence in said first elongated section of said conduit, positioned downstream of said acid injection means, a coagulant injection means for injecting coagulant into a second elongated section of said conduit, positioned downstream of said first in-line mixing means, a second in-line mixing means for inducing turbulence in said second elongated section of said conduit, positioned downstream of said coagulant injection means, a flocculent injection means for injecting flocculent into a third elongated section of said conduit, positioned downstream of said second in-line mixing means, a third in-line mixing means for inducing turbulence in said third elongated section of said conduit, positioned downstream of said flocculent injection means, wherein the diameter of said third elongated section is enlarged downstream of said third in-line mixing means to reduce fluid turbulence and prevent solid particle dispersion in said waste drilling mud;

a centrifuge coupled with the intermixing means to receive the waste drilling fluid mixed with acid, coagulant and flocculent from the intermixing means and operative to separate said mixture into solids and centrifuged water containing acid and flocculent; and chemical treating means for treating the centrifuged water to remove acid, coagulant and flocculent therefrom to produce said water clarity.

9. A dewatering apparatus for recovering water from waste drilling fluid for concurrent reutilization in an active drilling operation to dilute drilling mud comprising:

a first storage area for said waste drilling fluid;

an intermixing means coupled with said storage area for combining said waste drilling fluid with water, acid, coagulant and flocculent wherein said intermixing means is comprised of a conduit having a series of three parallel interconnected sections for conducting fluid flow from an inlet to an outlet wherein the total length of the three sections is approximately one hundred twenty feet, wherein the second section has a residence time approximately twice a residence time of the first section, and the third section has a residence time approximately four times the residence time of the first section and wherein the total residence time allows the waste drilling fluid to be retained for a period sufficient to produce a water clarity necessary for reutilization of resultant water in concurrent drilling operations, a water injection means for injecting water into said conduit, positioned near said inlet of said conduit, an acid injection means for injecting acid into said conduit, positioned downstream of said water injection means, a first in-line mixing means for inducing fluid turbulence in said conduit, positioned downstream of said acid injection means, a coagulant injection means for injecting coagulant into said conduit, positioned downstream of said first in-line mixing means, a second in-line mixing means for inducing fluid turbulence in said conduit, positioned downstream of said coagulant injection means, a flocculent injection means for injecting flocculent into said conduit, positioned downstream of said second in-line mixing means and a third in-line mixing means for inducing fluid turbulence in said conduit positioned downstream of said flocculent injection means, wherein the volumes of the first, second, and third sections are in the ratio of approximately 1:2:4, respectively;

a pump operatively connected to transfer said waste drilling fluid from said first storage area through said intermixing means;

a centrifuge operatively connected to receive said waste drilling fluid from said intermixing means and separate said waste drilling fluid into solids and centrifuged water containing acid, coagulant and flocculent;

a second storage area positioned to receive the centrifuged water containing acid, coagulant and flocculent;

a third storage area;

a decanting means for chemically treating the centrifuged water to remove acid, coagulant and flocculent to produce said water clarity, said decanting means being operatively connected to transfer said water to said third storage area.

* * * * *